(12) United States Patent
Kim et al.

(10) Patent No.: US 9,203,065 B2
(45) Date of Patent: Dec. 1, 2015

(54) BATTERY MODULE

(75) Inventors: Myung-Chul Kim, Yonsin-si (KR); Hyun-Ye Lee, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1373 days.

(21) Appl. No.: 12/948,712

(22) Filed: Nov. 17, 2010

(65) Prior Publication Data

US 2012/0040226 A1 Feb. 16, 2012

Related U.S. Application Data

(60) Provisional application No. 61/372,299, filed on Aug. 10, 2010.

(51) Int. Cl.
| | |
|---|---|
| *H01M 2/10* | (2006.01) |
| *H01M 10/04* | (2006.01) |
| *H01M 10/61* | (2014.01) |
| *H01M 2/12* | (2006.01) |
| *H01M 10/625* | (2014.01) |
| *H01M 10/647* | (2014.01) |
| *H01M 10/6557* | (2014.01) |
| *H01M 10/613* | (2014.01) |
| H01M 10/052 | (2010.01) |

(52) U.S. Cl.
CPC .......... *H01M 2/1077* (2013.01); *H01M 2/1083* (2013.01); *H01M 2/12* (2013.01); *H01M 10/0481* (2013.01); *H01M 10/613* (2015.04); *H01M 10/625* (2015.04); *H01M 10/647* (2015.04); *H01M 10/6557* (2015.04); *H01M 10/052* (2013.01)

(58) Field of Classification Search
CPC ........... H01M 2/00–2/02; H01M 2/10; H01M 2/1016; H01M 2/1061–2/1066
See application file for complete search history.

(56) References Cited

U.S. PATENT DOCUMENTS

| | | | |
|---|---|---|---|
| 5,800,942 A * | 9/1998 | Hamada et al. | 429/148 |
| 7,625,665 B2 | 12/2009 | Jeon et al. | |
| 8,039,141 B2 | 10/2011 | Jeon et al. | |
| 8,399,118 B2 | 3/2013 | Gadawski et al. | |
| 8,420,250 B2 | 4/2013 | Kim et al. | |
| 2006/0115719 A1 | 6/2006 | Jeon et al. | |

(Continued)

FOREIGN PATENT DOCUMENTS

| | | |
|---|---|---|
| CN | 101312240 A | 11/2008 |
| EP | 1 701 404 A1 | 9/2006 |

(Continued)

OTHER PUBLICATIONS

Machine Translation of JP 2001-236937 (Aug. 2001).*

(Continued)

*Primary Examiner* — Jonathan Crepeau
*Assistant Examiner* — Jacob Buchanan
(74) *Attorney, Agent, or Firm* — Christie, Parker & Hale, LLP

(57) ABSTRACT

A battery module includes a plurality of batteries stacked together; a plate between adjacent ones of the batteries, the plate comprising a plate body; and a connecting tab extending from an edge of the plate body; and a first connection member extending along the batteries, wherein the first connection member has a coupling portion through which the connecting tab extends.

15 Claims, 18 Drawing Sheets

(56) References Cited

U.S. PATENT DOCUMENTS

| | | | |
|---|---|---|---|
| 2007/0037051 A1 | 2/2007 | Kim et al. | |
| 2007/0190409 A1 | 8/2007 | Sakurai | |
| 2007/0285052 A1 | 12/2007 | Jeon et al. | |
| 2008/0280194 A1* | 11/2008 | Okada ............................ | 429/99 |
| 2008/0292950 A1 | 11/2008 | Maeda et al. | |
| 2008/0318119 A1 | 12/2008 | Watanabe et al. | |
| 2009/0246616 A1 | 10/2009 | Koyama et al. | |

FOREIGN PATENT DOCUMENTS

| | | | | |
|---|---|---|---|---|
| EP | 1 753 058 A2 | 2/2007 | | |
| EP | 1 852 925 A1 | 11/2007 | | |
| JP | 61-148770 | 7/1986 | | |
| JP | 2001-236937 | 8/2001 | | |
| JP | 2006-127938 A | 5/2006 | | |
| JP | 2006-156392 A | 6/2006 | | |
| JP | 2006-236826 A | 9/2006 | | |
| JP | 2006-253149 A | 9/2006 | | |
| JP | 2007-48750 A | 2/2007 | | |
| JP | 2007265658 A | * 10/2007 | ............ | H01M 10/48 |
| JP | 2007-299544 | 11/2007 | | |
| JP | 2008-277085 | 11/2008 | | |
| JP | 2009-4362 A | 1/2009 | | |
| JP | 2009-009889 | 1/2009 | | |
| JP | 2009-170258 | 7/2009 | | |
| JP | 2009-205986 | 9/2009 | | |
| JP | 2009-231143 | 10/2009 | | |
| KR | 1998-067891 U | 12/1998 | | |
| KR | 10-2006-0085775 | 7/2006 | | |
| KR | 10-0649217 B1 | 11/2006 | | |
| KR | 10-0717751 | 5/2007 | | |
| KR | 10-2007-0117825 | 12/2007 | | |

OTHER PUBLICATIONS

Machine Translation of Fukaya et al. (JP 2007-265658), Oct. 2007.*

European Office action dated Dec. 10, 2012, for corresponding European Patent application 11161440.0, (3 pages).

SIPO Office action dated Jun. 4, 2014, with English translation, for corresponding Chinese Patent application 201110225318.6, (12 pages).

European Office action dated Jul. 17, 2012, for corresponding European Patent application 11161440.0, (4 pages).

European Search Report dated Jul. 28, 2011, for corresponding European Patent application 11161440.0.

Patent Abstracts of Japan, and English machine translation of Japanese Publication 2007-299544, dated Nov. 15, 2007, listed above, (16 pages).

Patent Abstracts of Japan, and English machine translation of Japanese Publication 2008-277085, dated Nov. 13, 2008, listed above, (14 pages).

Patent Abstracts of Japan, and English machine translation of Japanese Publication 2009-170258, dated Jun. 30, 2009, listed above, (23 pages).

Office action for Chinese Patent Application 201110225318.6 issued on Oct. 10, 2013 along with English Translation, pp. 1-16.

Machine English Translation for JP 2006-127938, 16 pages (May 18, 2006).

Machine English Translation for JP 2007-48750, 17 pages (Feb. 22, 2007).

Machine English Translation for JP 2009-4362, 27 pages (Jan. 8, 2009).

* cited by examiner

BATTERY MODULE

CROSS-REFERENCE TO RELATED APPLICATIONS

This application claims priority to and the benefit of U.S. Provisional Application No. 61/372,299, filed on Aug. 10, 2010, in the United States Patent and Trademark Office, the disclosure of which is incorporated herein in its entirety by reference.

BACKGROUND

1. Field

The present invention relates to a battery module having a plurality of batteries.

2. Description of the Related Art

A rechargeable battery differs from a primary battery in that it can be repeatedly charged and discharged, while the latter can only perform the irreversible conversion of chemical to electrical energy. A small-capacity rechargeable battery is used as the power supply for small electronic devices, such as cellular phones, notebook computers and camcorders, while a large-capacity rechargeable battery is used as the power supply for driving motors or the power storage battery in hybrid vehicles and the like.

A large capacity high power rechargeable battery using a non-aqueous electrolyte with a high energy density has been recently developed. The large capacity high power rechargeable battery is constructed as a high power battery module having a plurality of rechargeable cells coupled to each other in series such that it can be used in electric vehicles requiring high power.

A single large capacity battery module is formed of a plurality of rechargeable batteries coupled in series, and the rechargeable battery may have a cylindrical or prismatic shape.

The rechargeable battery is typically provided in a housing member and supported by end plates and connection members that fix the end plates together. However, the rechargeable battery can be damaged due to external impact if the rechargeable battery is unstably fixed. In addition, the rechargeable batteries are electrically coupled by the connection members so that the electrical connection between the rechargeable batteries can be maintained when the rechargeable batteries are stably fixed. When the rechargeable batteries are moved, contact resistance between terminals of rechargeable batteries is increased so that the output may be decreased or the electrical connection may be terminated.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a battery module that can stably fix rechargeable batteries.

In one embodiment, a battery module includes a plurality of batteries stacked together; a plate between adjacent ones of the batteries, the plate comprising a plate body; and a connecting tab extending from an edge of the plate body; and a first connection member extending along the batteries, wherein the first connection member has a coupling portion through which the connecting tab extends.

In one embodiment, the battery module further includes a pair of end plates each connected to the first connection member, wherein one of the pair of end plates is on each end of the batteries that are stacked together. The battery module may also include a second connection member extending along the batteries, wherein the second connection member is oriented substantially perpendicularly to the first connection member. The second connection member may have a plurality of openings configured to allow a coolant to pass therethrough.

In one embodiment, the plate further includes a support tab extending from an edge of the plate body, wherein the support tab extends in a direction substantially perpendicular to a plane of the plate body. The support tab may contact an edge of one of the batteries that is adjacent to the plate and the support tab and the second connection member may contact each other. The second connection member may include a reinforcement portion that contacts each of the batteries and is arc-shaped.

In one embodiment, the plate further includes a support tab that protrudes through an opening in the second connection member and a fixing tab that extends from an edge of the plate in a direction substantially perpendicular to a plane of the plate body. The connecting tab may have a notch contacting the first connection member.

According to the exemplary embodiments of the present invention, the rechargeable batteries can be stably fixed by the connection member and the plate.

DETAILED DESCRIPTION

Figure 1:
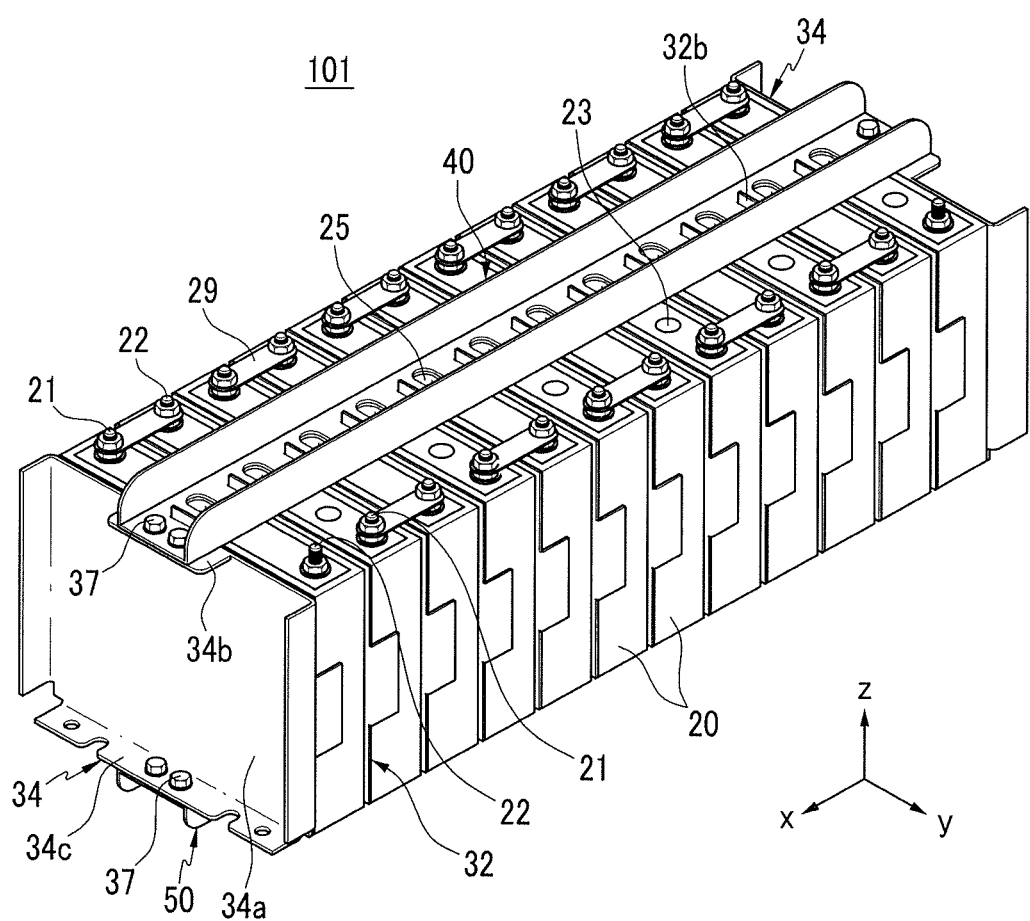
FIG. 1 is a perspective view of a battery module according to a first exemplary embodiment of the present invention.

Embodiments of the present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention. Like reference numerals designate like elements throughout the specification and drawings.

Figure 2:
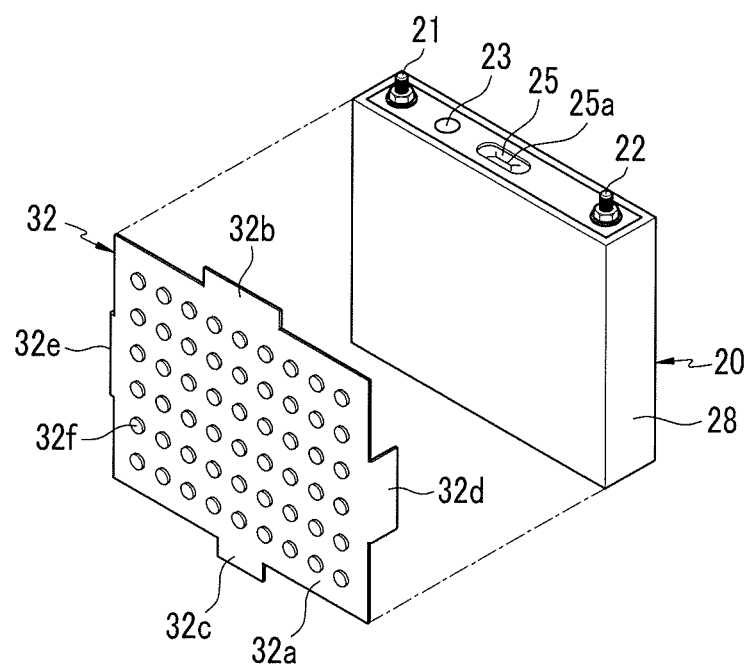
FIG. 2 is a partially exploded perspective view of a rechargeable battery and a plate of the battery module according to the first exemplary embodiment of the present invention.

FIG. 1 is a perspective view of a battery module according to a first exemplary embodiment of the present invention, and FIG. 2 is a partially exploded perspective view of a rechargeable battery and a plate of the battery module according to the first exemplary embodiment of the present invention.

Referring to FIG. 1 and FIG. 2, a battery module 101 according to the first exemplary embodiment includes a plurality of rechargeable batteries 20, a plate 32 located between adjacent batteries of the plurality of rechargeable batteries 20, end plates 34 located at ends of the stack of rechargeable batteries 20, and connection members 40 and 50 connecting the end plates 34 in a fixed manner.

The rechargeable battery 20 is exemplarily formed as a prismatic-shaped lithium ion rechargeable battery. However, the present invention is not limited thereto. That is, embodiments various types of batteries including a lithium polymer battery or a cylindrical battery may be applied.

Each of the rechargeable batteries 20 includes a case 28 in which an electrode assembly is installed or housed, a positive electrode terminal 21, and a negative electrode terminal 22. The positive and negative electrode terminals 21 and 22 protrude to the outside of the case 28. In addition, the rechargeable battery 20 further includes a vent member 25 having a notch 25a configured to be opened at a predetermined pressure to emit gas and a sealing cap 23 sealing an electrolyte solution injection hole.

The case 28 is formed in a substantially cubic prismatic shape, and made from a metal such as aluminum or an aluminum alloy. A positive electrode terminal 21 electrically connected with a positive electrode of an electrode assembly and a negative electrode terminal 22 electrically connected with a negative electrode of the electrode assembly are formed protruding from an upper portion of the rechargeable battery 20.

The plurality of rechargeable batteries 20 are layered or stacked in parallel with each other along a side direction (i.e., x-axis direction of FIG. 1) such that wide front sides of the rechargeable batteries 20 face each other.

The rechargeable batteries 20 arranged in parallel with each other are coupled in series by a bus-bar 29. That is, the bus-bar 29 is provided in a positive electrode terminal 21 at one rechargeable battery 20 and a negative electrode terminal 22 of a neighboring rechargeable battery 20 while positive and negative electrode terminals 21 and 22 of neighboring rechargeable batteries 20 are arranged in a crossed or alternating manner. The bus-bar 35 is formed in a plate shape, and is fixed to the positive and negative electrodes 21 and 22 by a nut.

The plate 32 includes a cooling plate body 32a, support protrusions 32b and 32a protruding from a periphery of the cooling plate body 32a, and fixing portions 32d and 32e bent from the periphery of the cooling plate body 32a. The cooling plate body 32a is formed as a rectangular plate, and includes a plurality of separating protrusions 32f forming a coolant path by separating a neighboring rechargeable battery 20 from the plate 32.

Each of the separating protrusions 32f has a cylindrical shape, and is formed on a wide front side of the cooling plate body 32a, wherein adjacent separating protrusions are spaced from each other. Accordingly, a coolant such as air is supplied through the coolant path formed between the plate 32 and the rechargeable battery 20 such that the rechargeable batteries 20 can be easily cooled.

The support protrusions include an upper support protrusion 32b protruding from an upper end of the cooling plate body 32a and a lower support protrusion 32c protruding from a lower end of the cooling plate body 32a. The support protrusions 32b and 32c have a substantially rectangular shape, and protrude from the case 28 of the rechargeable battery 20.

The fixing portions 32d and 32e are bent at lateral ends of the cooling plate body 32a and contact a side of the rechargeable battery 20. The fixing portions 32d and 32e are bent substantially perpendicularly toward the rechargeable battery 20 that is closely attached to the cooling plate body 32a, and are closely attached to a side of the rechargeable battery 20 to prevent the rechargeable battery 20 from moving laterally with respect to the other batteries. Accordingly, the plate 32 moves laterally along with the rechargeable battery 20.

Since the end plates 34 are located at the ends of the stacked rechargeable batteries 20, the two end plates 34 can press the rechargeable batteries 20 towards each other; i.e., compress the stacked batteries. The end plate 34 includes a fixing plate 34a supporting the rechargeable batteries 20 by pressing them together and fasting plates 34b and 34c bent to the outside at upper and lower ends of the fixing plate 34a. Openings are configured to receive bolts 37 in the fastening plates 34b and 34c.

The end plates 34 are provided with the connection members 40 and 50 supporting two end plates 34, and the connection members 40 and 50 are extended along the layered direction (i.e., x-axis direction of FIG. 1) of the rechargeable batteries 20 such that the lateral ends thereof are respectively fixed to the end plates 34. The connection members 40 and 50 include an upper connection member 40 provided in the upper portion of the battery module 101 and a lower connection member 50 provided in the lower portion of the battery module 101.

Figure 3:
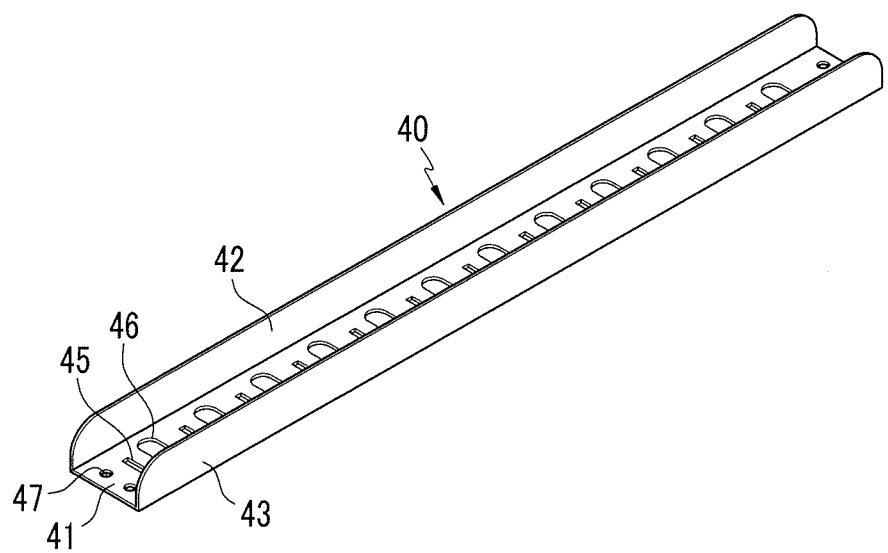
FIG. 3 is a perspective view of an upper connection member according to the first exemplary embodiment of the present invention.

As shown in FIG. 3, the upper connection member 40 includes a support plate 41 and reinforcement plates 42 and 43 bent from side edges of the support plate 41, and a fastening hole 47 is formed in the support plate 41 such that the upper connection member 40 can be fixed to the fastening plate 34b formed at the upper portion of the end plate 34 by the bolt 37 and the nut through the fastening hole 47.

A coupling portion 45 through which the support protrusion 32b is inserted and an exhaust hole 46 providing a path for gas emission when the vent member 25 of the rechargeable battery 20 is opened are formed in the support plate 41. In the support plate 41, a plurality of coupling portions 45 and a plurality of exhaust holes 46 are arranged at a distance from each other along the length direction of the support plate 41. The coupling portion 45 may be formed in a hole or groove shape. The support protrusion 32b of each plate 32 is inserted to the coupling portion 45 to prevent the plate 32 from moving laterally with respect to the upper connection member 40.

The exhaust holes 46 are located to generally correspond to the vent members 25 of the rechargeable batteries 20, and accordingly, when the vent members 25 are opened, internal gas of the rechargeable batteries 20 can be promptly emitted to the outside through a space between the reinforcement plates 42 and 43.

Figure 4:
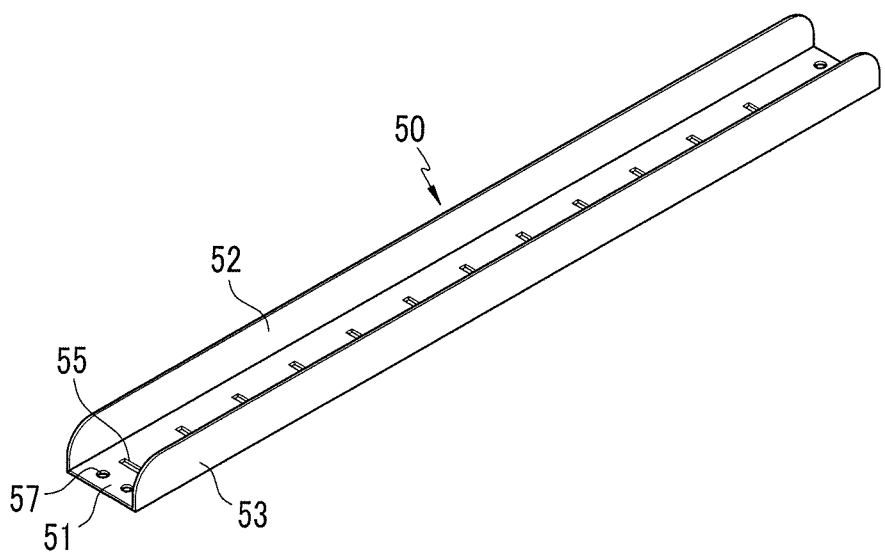
FIG. 4 is a perspective view of a lower connection member according to the first exemplary embodiment of the present invention.

As shown in FIG. 4, the lower connection member 50 includes a support plate 51 and reinforcement plates 52 and 53 extending from side edges of the support plate 51 and a fastening hole 57 is formed in the support plate 51 such that the lower connection member 50 is fixed to the fastening plate 34c formed in the lower portion of the end plate 34 by the bolt 37 and the nut through the fastening hole 57.

A plurality of coupling portions 55 through which the support protrusion 32c is inserted are formed in a hole shape in the support plate 51, and the coupling portions 55 are spaced from each other along the length direction of the support plate 51. The support protrusion 32c of each plate 32 is inserted into each of the coupling portions 55 to prevent the plate 32 from laterally with respect to the lower connection member 50.

Since the fixing portion 32d and 32e formed in the plate 32 fix the side ends of the rechargeable battery 20, the rechargeable battery 20 can be supported along the side direction by the plate 32 and the connection members 40 and 50. In addition, the bottoms of the upper and lower connection members 40 and 50 contact the plate 32 and the upper end of the rechargeable battery 20 so that the plate 32 and the rechargeable battery 20 can be prevented from moving vertically with respect to each other.

Figure 5:
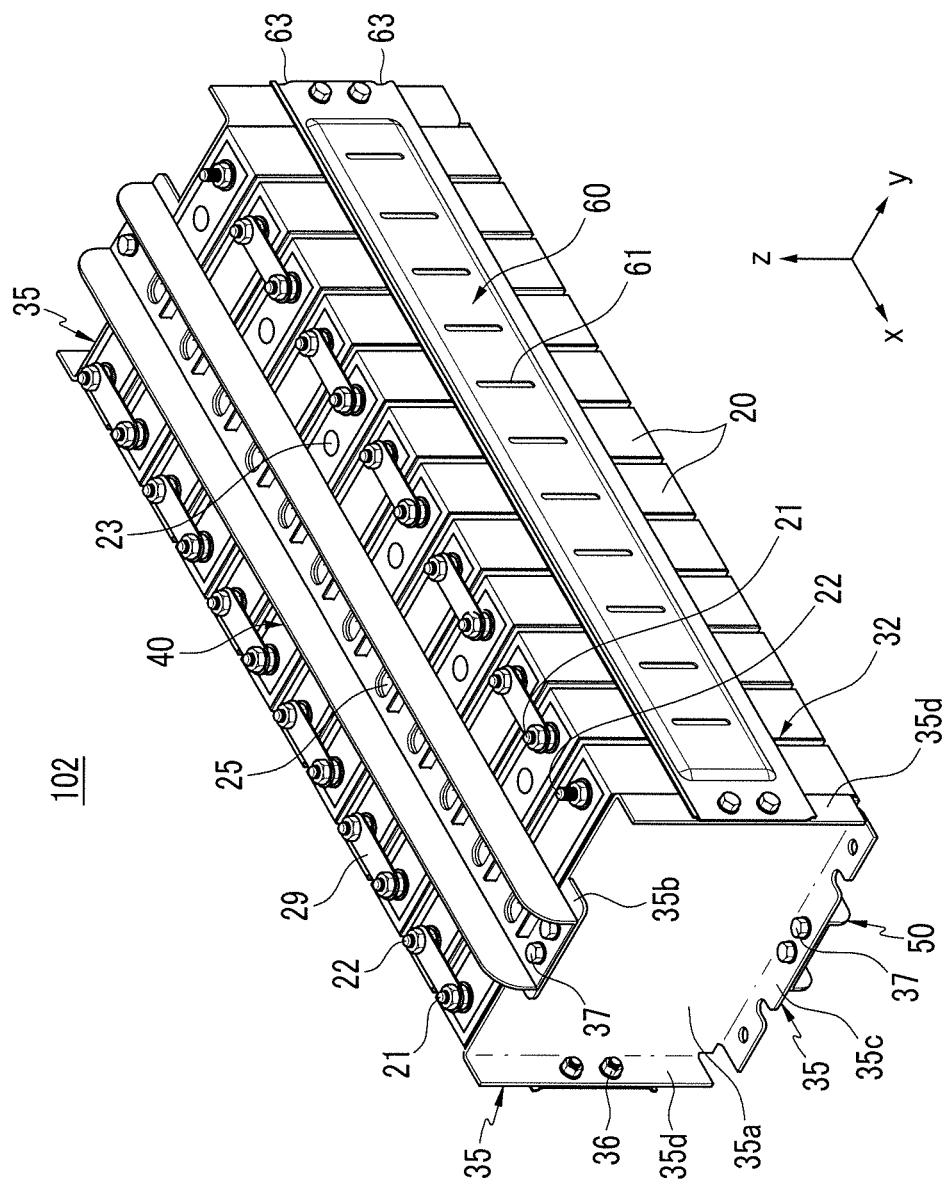
FIG. 5 is a perspective view of a battery module according to a second exemplary embodiment of the present invention.
Figure 6:
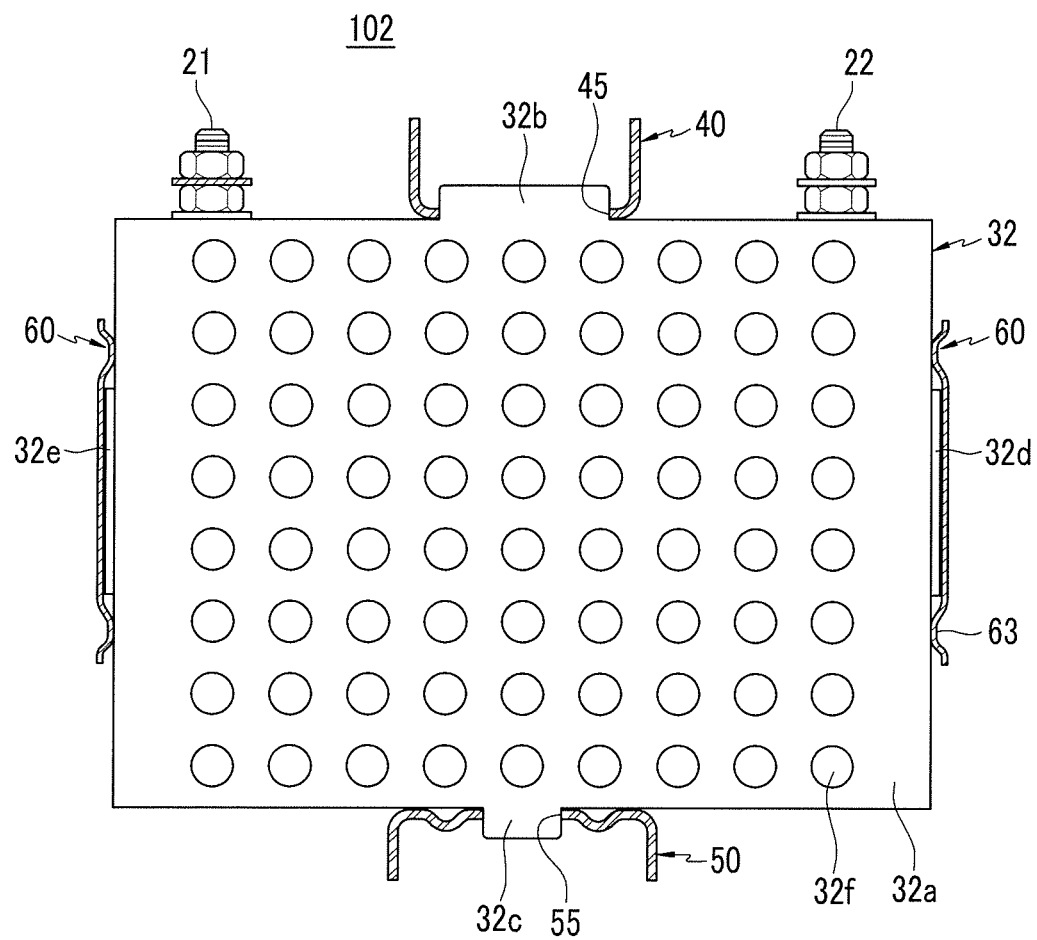
FIG. 6 is a cross-sectional view of a battery module according to a second exemplary embodiment of the present invention.

FIG. 5 is a perspective view of a battery module according to a second exemplary embodiment of the present invention, and FIG. 6 is a vertical sectional view of the battery module according to the second exemplary embodiment of the present invention.

Referring to FIG. 5 and FIG. 6, a battery module 102 according to the second exemplary embodiment includes a plurality of rechargeable batteries 20, plates 32 located between the rechargeable batteries 20, end plates 35 on the outer sides of the rechargeable batteries 20, and connection members 40, 50 and 60 connecting the end plates 35 in a fixed manner.

Since the plurality of rechargeable batteries 20 are layered in parallel with each other such that wide front sides of the rechargeable batteries 20 face each other. The rechargeable battery 20 of the present exemplary embodiment is the same as the rechargeable battery of the first exemplary embodiment in structure, and therefore no further detailed description will be omitted.

Each of the plates 32 includes a cooling plate body 32a, support protrusions 32b and 32c protruding from the circumference of the cooling plate body 32a, and fixing portions 32d and 32e bent from a periphery of the cooling plate body 32a. The cooling plate body 32a is formed with a rectangular plate shape, and a plurality of separating protrusions 32f forming a coolant path by separating neighboring rechargeable batteries 20 are formed in the cooling plate body 32a.

The separating protrusions 32f each have a cylindrical shape and are separated from each other by a constant gap on a wide substantially planar front side of the cooling plate body 32a. Accordingly, a coolant such as air is supplied through the coolant path between the plate 32 and the rechargeable battery 20 such that rechargeable batteries 20 can be easily cooled.

The support protrusions include an upper support protrusion 32b protruding from the upper end of the cooling plate body 32a and a lower support protrusion 32c protruding from the lower end of the cooling plate body 32a. The support protrusions 32b and 32c have a substantially rectangular shape, and protrude more to the outside than the rechargeable battery 20.

The fixing portions 32d and 32e are formed by being bent at the lateral sides of the cooling plate body 32a and contact the side of the rechargeable battery 20. The fixing portions 32d and 32e are substantially perpendicularly bent toward the rechargeable battery 20 that is closely attached to the cooling plate body 32a, and are closely attached to the side of the rechargeable battery 20 to prevent the rechargeable battery 20 from moving laterally with respect to the cooling plate body. Accordingly, the plate 32 moves along with the rechargeable battery 20.

Two end plates 35 are located at the outermost sides of the layered rechargeable batteries 20. The end plates 35 are provided with the connection members 40, 50 and 60 supporting the two end plates 35, and the connection members 40, 50 and 60 are extended along the layered direction (i.e., the x-axis direction) of the rechargeable batteries 20 such that the lateral ends thereof are respectively fixed to the end plates 35. The connection members 40, 50, and 60 include an upper connection member provided at the upper portion of the battery module 102, a lower connection member 50 provided at the lower portion of the battery module 102, and side connection members 60 provided at sides of the battery module 102.

Each end plate 35 includes a fixing portion 35a supporting the rechargeable battery 20 by pressing the same toward the opposite end plate, fastening plates 35b and 35c bent outwardly from the upper and lower portions of the fixing plate 35a, and fastening plates 35d bent at both sides of the fixing plate 35a. Openings are formed in the fastening plates 35b and 35c for insertion of bolts 37 therein.

The upper connection member 40, the lower connection member 50, and the side connection members 60 are fixed to the end plate 35 by the bolts 37 and nuts 36. That is, the upper and lower connection members 40 and 50 are respectively fixed to the fastening plates 35b and 35c bent at the upper and lower portions of the fixing plate 35a, and the side connection members 60 are fixed to the fastening plate 35d bent at the sides of the fixing plate 35a.

The upper and lower connection members 40 and 50 of the present exemplary embodiment are substantially the same as those of the first exemplary embodiment. However, reinforcement portions extending along the length direction of the upper and lower connection members 40 and 50 and away from the battery module may be included on the upper and lower connection members.

The side connection members 60 include openings 61 at locations corresponding to the locations of the plates 32 so that a coolant can be easily inserted through the coolant path formed by the plate 32. In addition, reinforcement portions 63 extending along the length direction of the side connection member 60 and bent toward the outside of the battery module are formed at upper and lower ends of the side connection member 60.

According to the present exemplary embodiment, the upper connection member 40, the lower connection member 50, and the side connection members 60 are fixed to the end plates 35 so that the rechargeable batteries 20 can be further stably fixed.

Figure 7:
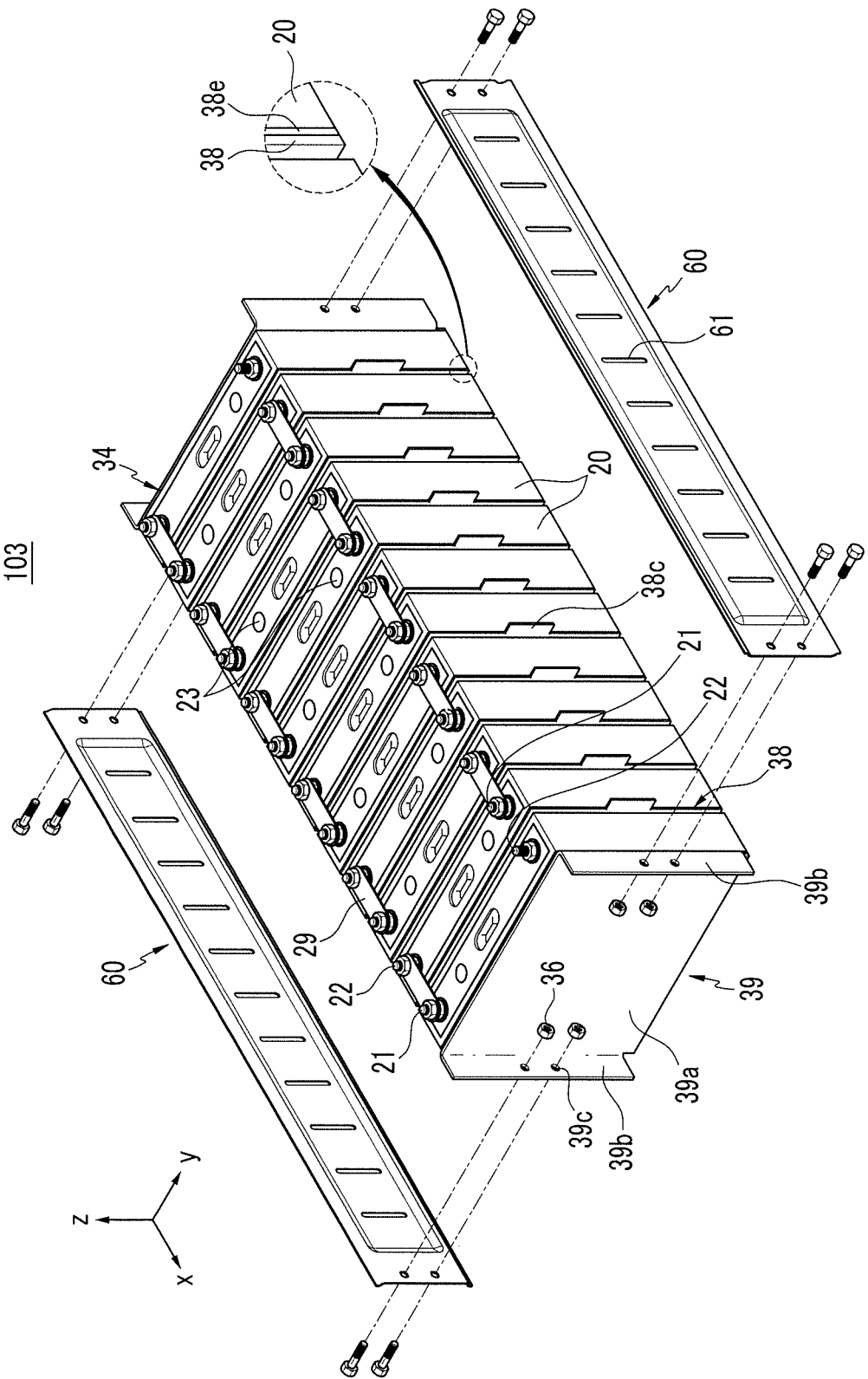
FIG. 7 is a partially exploded view of a battery module according to a third exemplary embodiment of the present invention.
Figure 8:
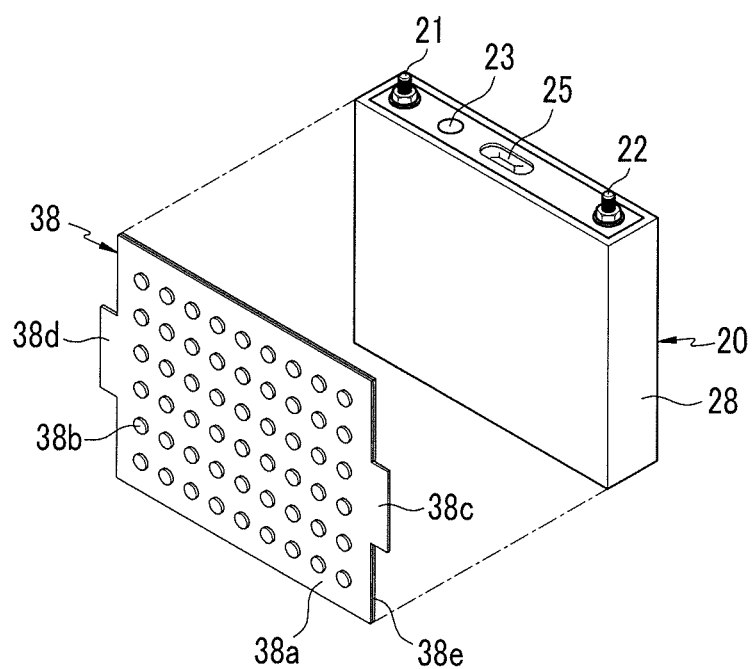
FIG. 8 is an exploded sectional view of a rechargeable battery and a plate of the battery module according to the third exemplary embodiment of the present invention.
Figure 9:
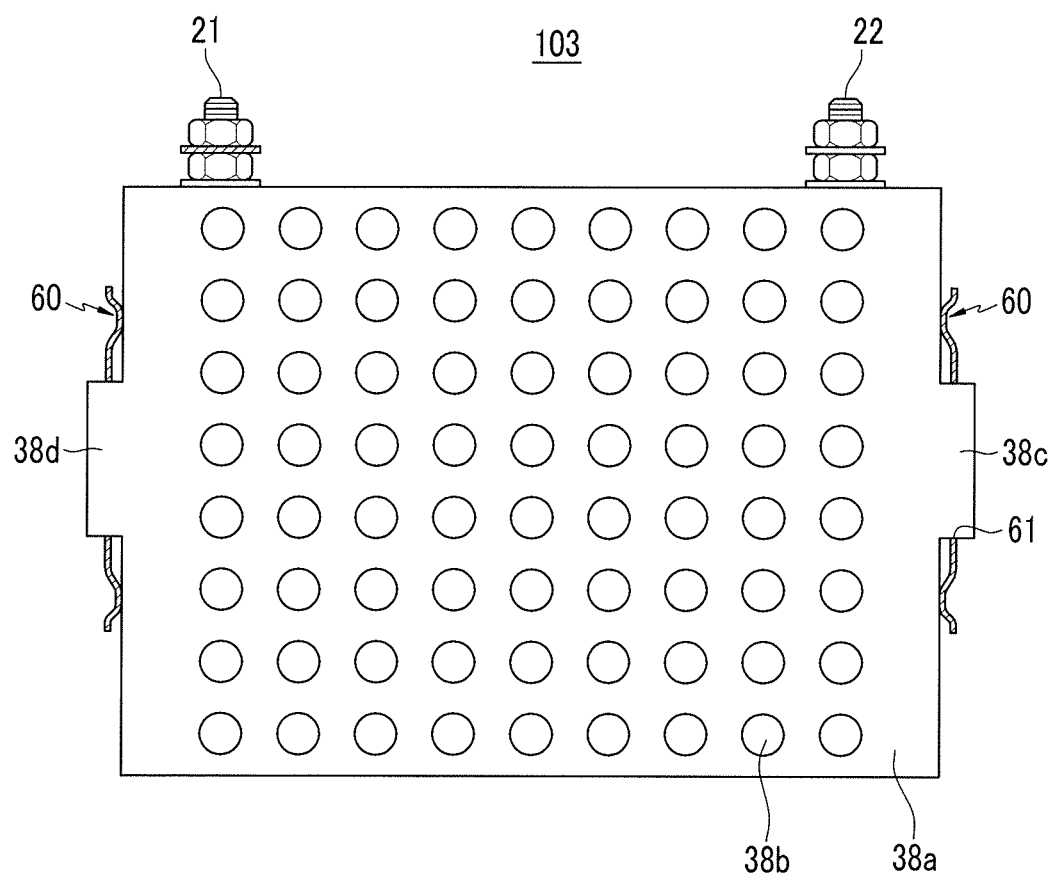
FIG. 9 is a cross-sectional view of the battery module according to a fourth exemplary embodiment of the present invention.

FIG. 7 is a partially exploded perspective view of a battery module according to a third exemplary embodiment of the present invention, FIG. 8 is a partially exploded perspective of a rechargeable battery and a plate of the battery module according to the third exemplary embodiment of the present invention, and FIG. 9 is a vertical sectional view of the battery module according to the third exemplary embodiment of the present invention.

Referring to FIG. 7 to FIG. 9, a battery module 103 according to the present exemplary embodiment includes a plurality of rechargeable batteries 20, plates 38 located between the rechargeable batteries 20, end plates 39 located at the ends of the stacked rechargeable batteries 20, and side connection members 60 connecting the end plates 39 in a fixed manner.

The plurality of rechargeable batteries 20 are layered in parallel with each other along the side direction such that wide front sides of the rechargeable batteries 20 face each other. The rechargeable battery 20 of the present exemplary embodiment is the same as the rechargeable battery of the first exemplary embodiment in structure, and therefore no further detailed description will be omitted.

Each of the plates 38 includes a rectangular-shaped cooling plate body 38a, a plurality of separating protrusions 38b forming a coolant path by separating neighboring rechargeable batteries 20, and support protrusions 38c and 38d protruding from both side ends of the coolant plate 38a.

The separating protrusions 38b each having a cylindrical shape are separated from each other with a constant gap on a wide front side of the cooling plate body 38a. Accordingly, a coolant such as air is supplied through the coolant path between the plate 38 and the rechargeable battery 20 such that rechargeable batteries 20 can be easily cooled.

The support protrusions 38c and 38d protrude from both side ends of the cooling plate body 32a, and have a substantially rectangular shape. The support protrusions 38c and 38d protrude more than a case 28.

Two end plates 39 are located at the ends of the layered rechargeable batteries 20. The end plates 39 are provided with the side connection members 60 supporting the two end plates 35, and the side connection members 60 are extended along the layered direction (i.e., the x-axis direction) of the rechargeable batteries 20 such that the lateral ends thereof are respectively fixed to the end plates 39. The side connection members 60 are fixed to both side ends of the battery module 104.

Each end plate 39 includes a fixing plate 39a supporting the rechargeable batteries 20 by pressing it toward the other end plate and fastening plates bent at both sides of the fixing plate 39a. Holes 39 are formed in the fastening plates 39b for insertion of bolts 37.

The side connection members 60 are fixed to the end plates 39 by the bolts 27 and nuts 36 such that the side connection members 60 are fixed to the fastening plates 39b.

The side connection members 60 include openings 61 at locations corresponding to the locations of the plates 38, and the support protrusions 38c and 38d are inserted into the openings 61. Since the plate 38 is attached to the rechargeable battery 20 using a thermal conductivity adhesive layer 38e, the thermal conductivity adhesive layer 38e is formed on the cooling plate body 38a.

The thermal conductivity adhesive layer 38e may be formed by a thermal conductive adhesive including sliver (Ag) epoxy or another thermally conductive material.

As described, according to the present exemplary embodiment, the plate 38 fixed to the rechargeable battery 20 is supported by the side connection members 60 so that the rechargeable batteries 20 can be stably fixed.

Figure 10:
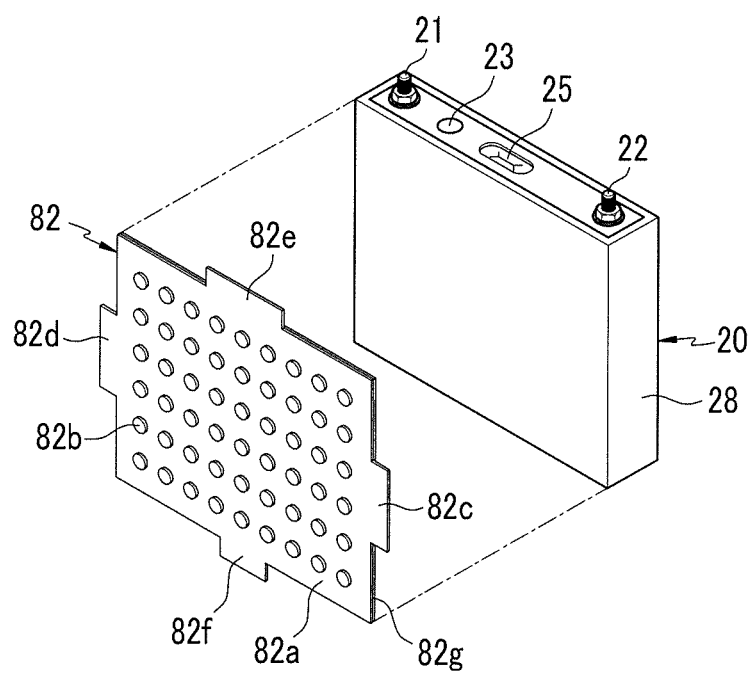
FIG. 10 is a partially exploded perspective view of a rechargeable battery and a plate of a battery module according to the fourth exemplary embodiment of the present invention.
Figure 11:
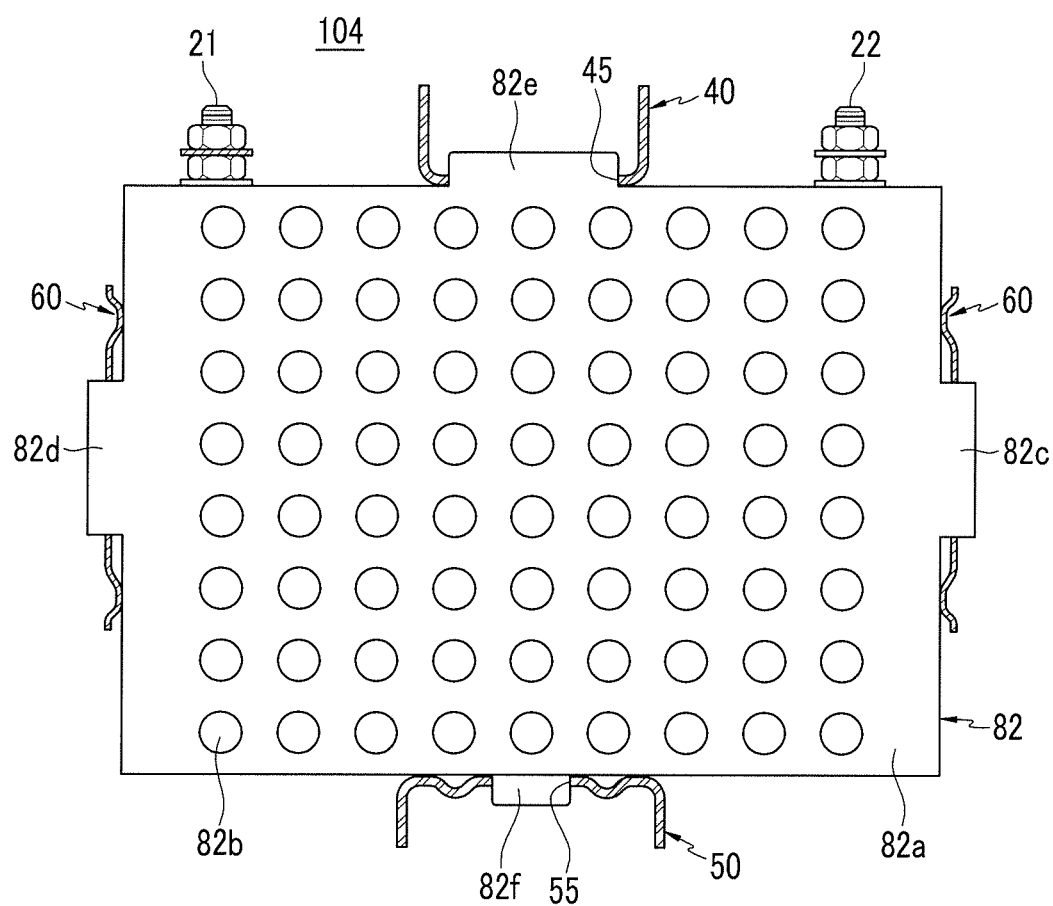
FIG. 11 is a vertical sectional view of the battery module according to the fourth exemplary embodiment of the present invention.

FIG. 10 is a partially exploded perspective view of a rechargeable battery and a plate of a battery module according to a fourth exemplary embodiment of the present invention and FIG. 11 is a vertical sectional view of the battery module according to the fourth exemplary embodiment of the present invention.

Referring to FIG. 10 and FIG. 11, a battery module 104 according to the present exemplary embodiment includes a plurality of rechargeable batteries 20, plates 82 located between the rechargeable batteries 20, end plates on the ends of the stacked rechargeable batteries 20, and connection members 40, 50 and 60 connecting the end plates in a fixed manner.

The plurality of rechargeable batteries 20 are layered in parallel with each other such that wide front sides of the rechargeable batteries 20 face each other. The rechargeable batteries 20 of the present exemplary embodiment are the same as the rechargeable battery of the first exemplary embodiment in structure, and therefore no further detailed description will be omitted.

Each of the plates 82 includes a rectangular-shaped cooling plate body 82a, a plurality of separating protrusions 82b forming a coolant path by separating neighboring rechargeable batteries 20, side support protrusions 82c and 82d protruding from both side ends of the cooling plate body 82a, an upper support protrusion 82e protruding from the upper end of the coolant plate 82a, and a lower support protrusion 82f protruding from the lower end of the cooling plate body 82a. The cooling plate body 82a is fixed to the rechargeable battery 20 using a thermal conductivity adhesive layer 82g.

The connection members 40, 50, and 60 are extended along the layered direction (i.e., the x-axis direction) of the rechargeable batteries 20 such that the lateral ends thereof are respectively fixed to the end plates. The connection members 40, 50, and 60 include an upper connection member provided at the upper portion of the battery module 104, a lower connection member 50 provided at the lower portion of the battery module 104, and side connection members 60 provided at sides of the battery module 104.

The end plates, the upper connection member 40, the lower connection member 50, and the side connection members 60 are respectively the same as the end plates, the upper connection member, the lower connection member, and the side connection members of the battery module of the second exemplary embodiment in structure, and therefore no further description will be provided.

The upper support protrusion 82e is inserted to a coupling portion 45 formed in the upper connection member 40, the lower support protrusion 82f is inserted to a coupling portion 55 formed in the lower connection member 50, and the side support protrusions 82c and 82d are inserted to openings 61 formed in the side connection members 60.

Accordingly, the connection members 40, 50, and 60 can stably support the plates 82 and the rechargeable batteries 20 fixed to the plates 82 can be stably fixed.

Figure 12:
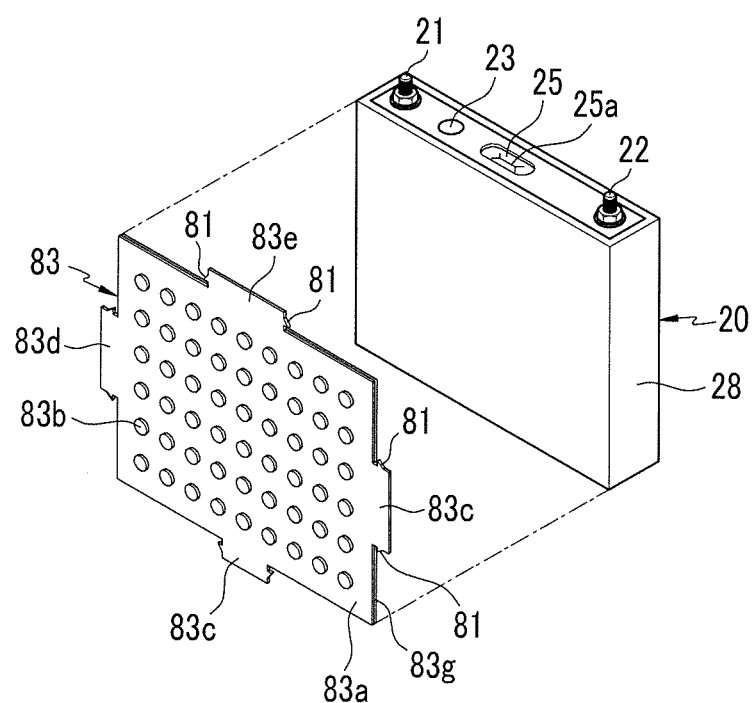
FIG. 12 is a partially exploded perspective view of a rechargeable battery and a plate of a battery module according to a fifth exemplary embodiment of the present invention.
Figure 13:
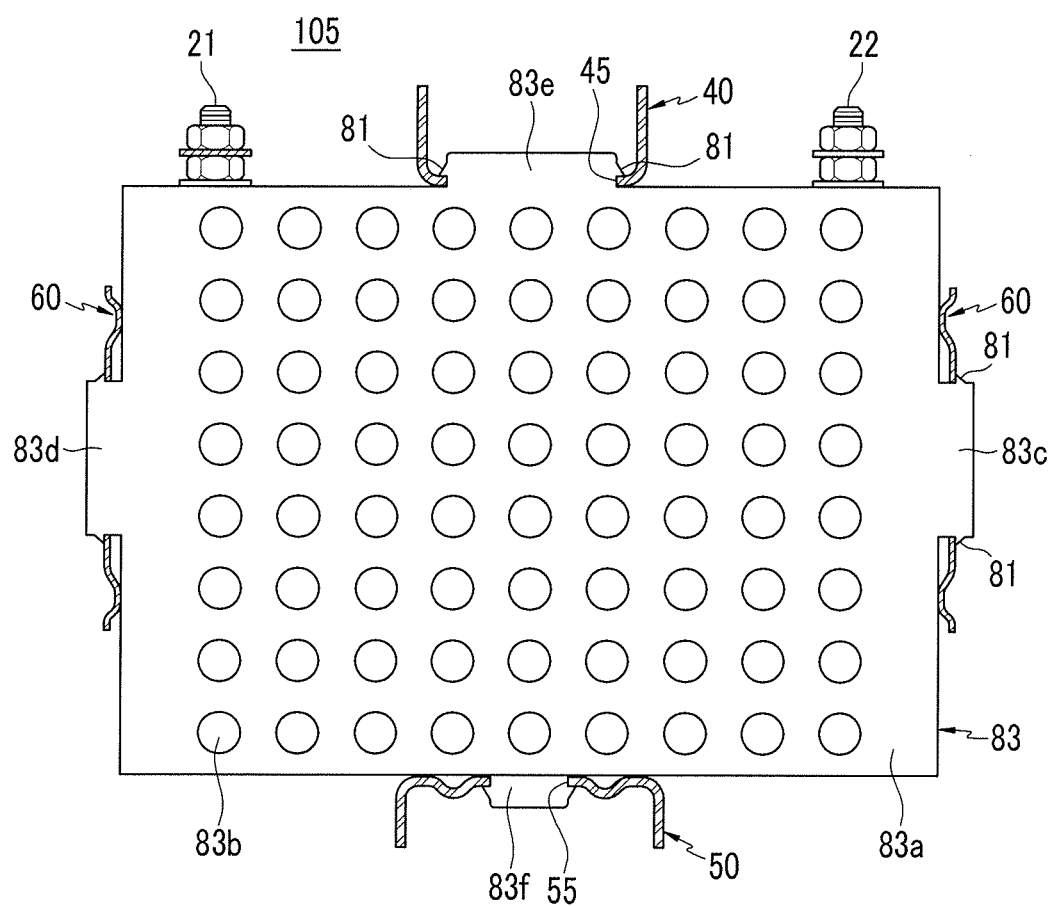
FIG. 13 is a vertical sectional view of the battery module according to the fifth exemplary embodiment of the present invention.

FIG. 12 is a partially exploded perspective view of a rechargeable battery and a plate of a battery module according to a fifth exemplary embodiment of the present invention and FIG. 13 is a vertical sectional view of the battery module according to the fifth exemplary embodiment of the present invention.

Referring to FIG. 12 and FIG. 13, a battery module 105 according to the present exemplary embodiment includes a plurality of rechargeable batteries 20, plates 83 located between the rechargeable batteries 20, end plates on the ends of the rechargeable batteries 20, and connection members 40, 50 and 60 connecting the end plates in a fixed manner.

The plurality of rechargeable batteries 20 are layered in parallel with each other such that wide front sides of the rechargeable batteries 20 face each other. The rechargeable battery 20 of the present exemplary embodiment is substantially the same as the rechargeable battery of the first exemplary embodiment in structure, and therefore no further detailed description will be omitted.

Each of the plates 83 includes a rectangular-shaped cooling plate body 83a, a plurality of separating protrusions 83b forming a coolant path by separating a neighboring rechargeable batteries 20, side support protrusions 83c and 83d protruding from both side ends of the cooling plate body 83a, an upper support protrusion 83e protruding from the upper end of the coolant plate 83a, and a lower support protrusion 83f protruding from the lower end of the cooling plate body 83a. The cooling plate body 83a is fixed to the rechargeable battery 20 using a thermal conductivity adhesive layer 83g.

The upper support protrusion 82e, the lower support protrusion 83f, and the side support protrusions 83c and 83d are provided with notches 81 protruding to a side direction. The height of each notch 81 is gradually decreased toward an end portion of each support protrusion such that is has a sloped or wedge configuration.

The connection members 40, 50, and 60 are extended along the layered direction (i.e., the x-axis direction) of the rechargeable batteries 20 such that the lateral ends thereof are respectively fixed to the end plates. The connection members 40, 50, and 60 include an upper connection member provided at the upper portion of the battery module 104, a lower connection member 50 provided at the lower portion of the battery module 104, and side connection members 60 provided at sides of the battery module 104.

The end plates, the upper connection member 40, the lower connection member 50, and the side connection members 60 are the same as the end plates, the upper connection member, the lower connection member, and the side connection members, respectively, of the battery module of the second exemplary embodiment in structure, and therefore no further description will be provided.

The upper support protrusion 82e is inserted into a coupling portion 45 formed in the upper connection member 40, the lower support protrusion 82f is inserted to a coupling portion 55 formed in the lower connection member 50, and the side support protrusions 82c and 82d are inserted to openings 61 formed in the side connection members 60.

In this case, the upper connection member 40 is fixed at a location between the cooling plate body 83a and the notch 81, the lower connection member 50 is fixed at a location between the cooling plate body 83a and the notch 81, and the side connection members are fixed at locations between the cooling plate body 83a and the notches 81. Accordingly, the connection members 40, 50, and 60 and the plates 83 are more stably coupled so that the rechargeable batteries 20 fixed to the plates 83 are stably fixed.

Figure 14:
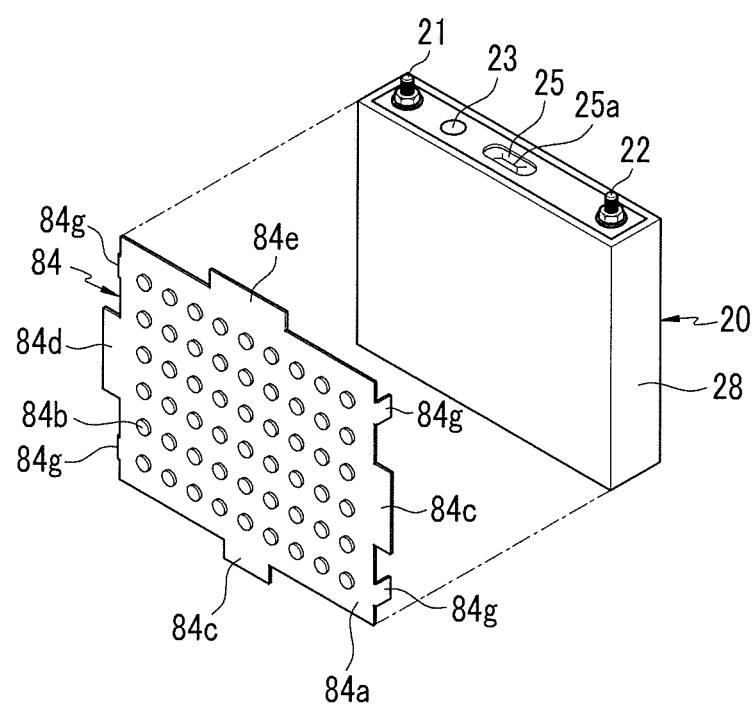
FIG. 14 is a partially exploded perspective view of a rechargeable battery and a plate of a battery module according to a sixth exemplary embodiment of the present invention.
Figure 15:
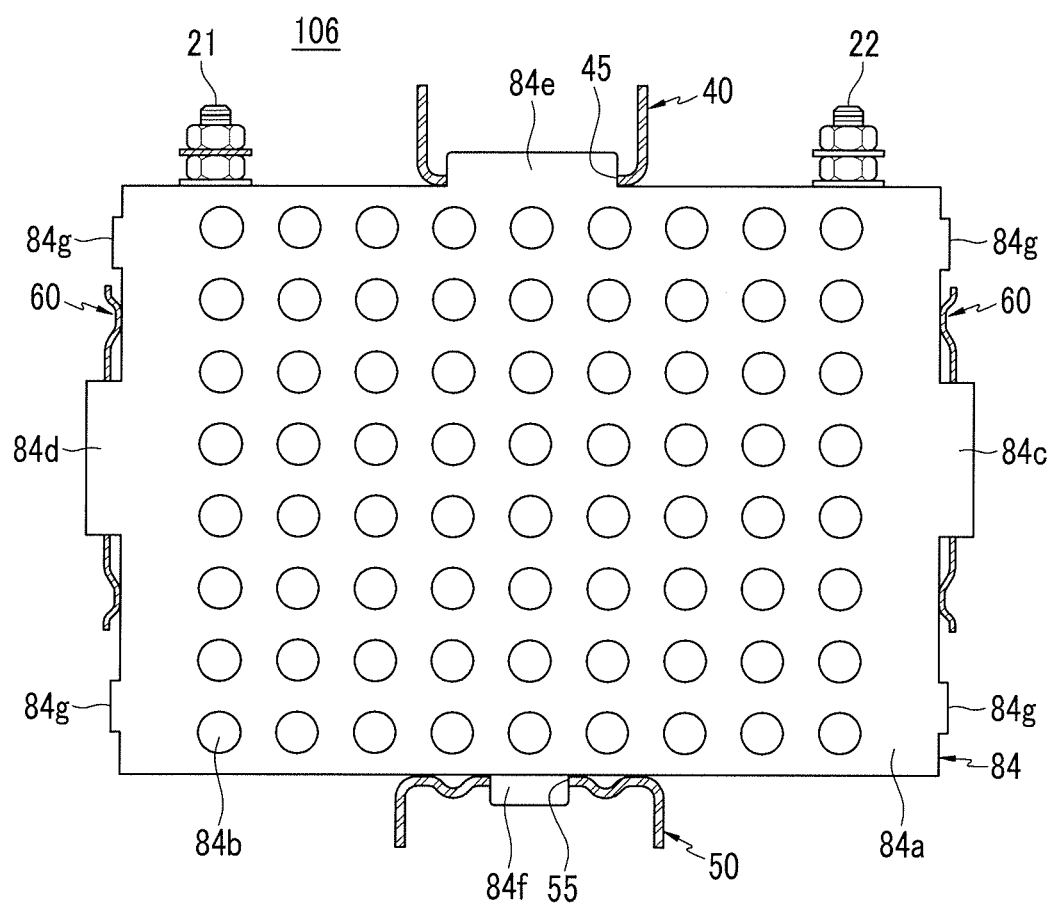
FIG. 15 is a vertical sectional view of the battery module according to the sixth exemplary embodiment of the present invention.

FIG. 14 is a partially exploded perspective view of a rechargeable battery and a plate of a battery module according to a sixth exemplary embodiment of the present invention and FIG. 15 is a vertical sectional view of the battery module according to the sixth exemplary embodiment of the present invention.

Referring to FIG. 14 and FIG. 15, a battery module 106 according to the present exemplary embodiment includes a plurality of rechargeable batteries 20, plates 84 located between the rechargeable batteries 20, end plates on the outer sides of the rechargeable batteries 20, and connection members 40, 50 and 60 connecting the end plates in a fixed manner.

The plurality of rechargeable batteries 20 are layered in parallel with each other such that wide front sides of the rechargeable batteries 20 face each other. The rechargeable battery 20 of the present exemplary embodiment is the same as the rechargeable battery of the first exemplary embodiment in structure, and therefore no further detailed description will be omitted.

Each of the plates 84 includes a rectangular-shaped cooling plate body 84a, a plurality of separating protrusions 84b forming a coolant path by separating a neighboring rechargeable battery 20, side support protrusions 84c and 84d protruding from both side ends of the cooling plate body 84a, an upper support protrusion 84e protruding from the upper end of the coolant plate 84a, a lower support protrusion 84f protruding from the lower end of the cooling plate body 84a, and fixing portions 84g bent at the side ends of the cooling plate body 84a.

Each of the support protrusions 84c, 84d, 84e, and 84f has a substantially rectangular shape, and protrudes more to the outside than a case 28 of the rechargeable battery 20.

The fixing portions 84g are formed by being bent at both side ends of the cooling plate body 84a and thus are configured contact a side of the rechargeable battery 20. The fixing portions 84g are respectively formed above and below the side support protrusions 84c and 84d.

The fixing portions 84g are perpendicularly bent toward the rechargeable battery 20 closely attached to the cooling plate body 84a, and closely attached to the side of the rechargeable battery 20 to prevent the rechargeable battery 20 from moving laterally with respect to the plate 84. Accordingly, the plate 84 moves along with the rechargeable battery 20.

The connection members 40, 50, and 60 are extended along the layered direction of the rechargeable batteries 20 such that the lateral ends thereof are respectively fixed to the end plates. The connection members 40, 50, and 60 include an upper connection member provided at the upper portion of the battery module 106, a lower connection member 50 provided at the lower portion of the battery module 106, and side connection members 60 provided at sides of the battery module 106.

The upper, lower, and side connection members 40, 50, and 60 of the present exemplary embodiment are the same as those of the second exemplary embodiment in structure, and therefore no further description will be provided.

The upper support protrusion 84e is inserted to a coupling portion 45 formed in the upper connection member 40, and the lower support protrusion 84f is inserted to a coupling portion 55 formed in the lower connection member 50. In addition, the side support protrusions 84c and 84d are inserted to openings 61 formed in the side connection members 60.

As described, according to the present exemplary embodiment, the plates 84 are fixed to the connection members 40, 50, and 60 by the support protrusions 84c, 84d, 84e, and 84f and the rechargeable batteries 20 are fixed to the plates 84 by the fixing portions 84a so that the rechargeable batteries 20 can be stably fixed and supported.

Figure 16:
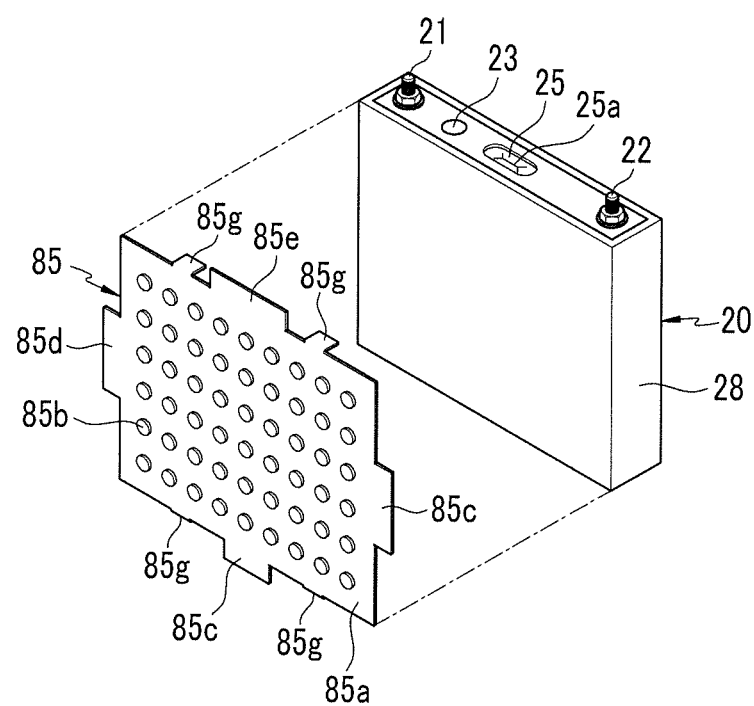
FIG. 16 is a partially exploded perspective view of a rechargeable battery and a plate of a battery module according to a seventh exemplary embodiment of the present invention.
Figure 17:
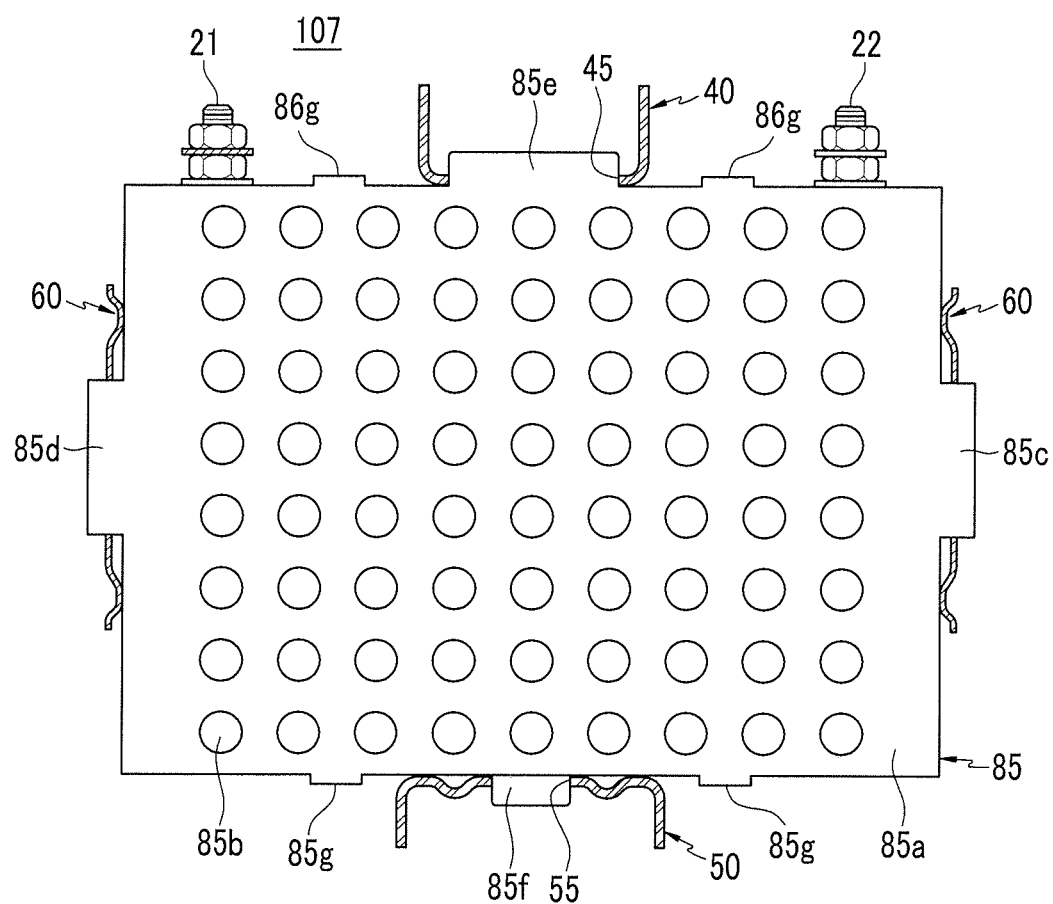
FIG. 17 is a vertical sectional view of a battery module according to an eighth exemplary embodiment of the present invention.

FIG. 16 is a partially exploded perspective view of a rechargeable battery and a plate of a battery module according to a seventh exemplary embodiment of the present invention and FIG. 17 is a vertical sectional view of the battery module according to the seventh exemplary embodiment of the present invention.

FIG. 16 and referring to FIG. 17, a battery module 107 according to the present exemplary embodiment includes a plurality of rechargeable batteries 20, plates 85 located between the rechargeable batteries 20, end plates on the outer sides of the rechargeable batteries 20, and connection members 40, 50 and 60 connecting the end plates in a fixed manner.

The plurality of rechargeable batteries 20 are layered in parallel with each other such that wide front sides of the rechargeable batteries 20 face each other. The rechargeable battery 20 of the present exemplary embodiment is the same as the rechargeable battery of the first exemplary embodiment in structure, and therefore no further detailed description will be omitted.

Each of the plates 85 includes a rectangular-shaped cooling plate body 85a, a plurality of separating protrusions 85b forming a coolant path by separating a neighboring rechargeable battery 20, side support protrusions 85c and 85d protruding from both side ends of the cooling plate body 85a, an upper support protrusion 85e protruding from the upper end of the coolant plate 85a, a lower support protrusion 85f protruding from the lower end of the cooling plate body 85a, and fixing portions 85g bent at upper and lower ends of the cooling plate body 85a.

Each of the support protrusions 85c, 85d, 85e, and 85f has a substantially rectangular shape, and protrudes more to the outside than a case 28 of the rechargeable battery 20.

The fixing portions 85g are formed by being bent at the upper and lower ends of the cooling plate body 85a and thus contact a side of the rechargeable battery 20. The fixing portions 85g are respectively formed at both sides of the upper and lower support protrusions 85e and 85f. The fixing portions 85g are perpendicularly bent toward the rechargeable battery 20 closely attached to the cooling plate body 85a, and closely attached to upper and lower sides of the rechargeable battery 20 to prevent the rechargeable battery 20 from moving with respect to the plate 85. Accordingly, the plate 85 moves with the rechargeable battery 20.

The connection members 40, 50, and 60 are extended along the layered direction of the rechargeable batteries 20 such that the lateral ends thereof are respectively fixed to the end plates. The connection members 40, 50, and 60 include an upper connection member provided at the upper portion of the battery module 107, a lower connection member 50 provided at the lower portion of the battery module 107, and side connection members 60 provided at sides of the battery module 107.

The end plates, the upper connection member 40, the lower connection member 50, and the side connection members 60 are the same as the end plates, the upper connection member, the lower connection member, and the side connection members, respectively, of the battery module of the second exemplary embodiment in structure, and therefore no further description will be provided.

The upper support protrusion 85e is inserted into a coupling portion 45 formed in the upper connection member 40 and the lower support protrusion 85f is inserted to a coupling portion 55 formed in the lower connection member 50. The side support protrusions 85c and 85d are inserted to openings 61 formed in the side connection members 60.

As described, according to the present exemplary embodiment, the plates 85 are fixed to the connection members 40, 50, and 60 by the support protrusions 85c, 85d, 85e, and 85f, and the rechargeable batteries 20 are fixed to the plates 85 by the fixing portions 85g so that the rechargeable batteries 20 can be stably fixed and supported.

Figure 18:
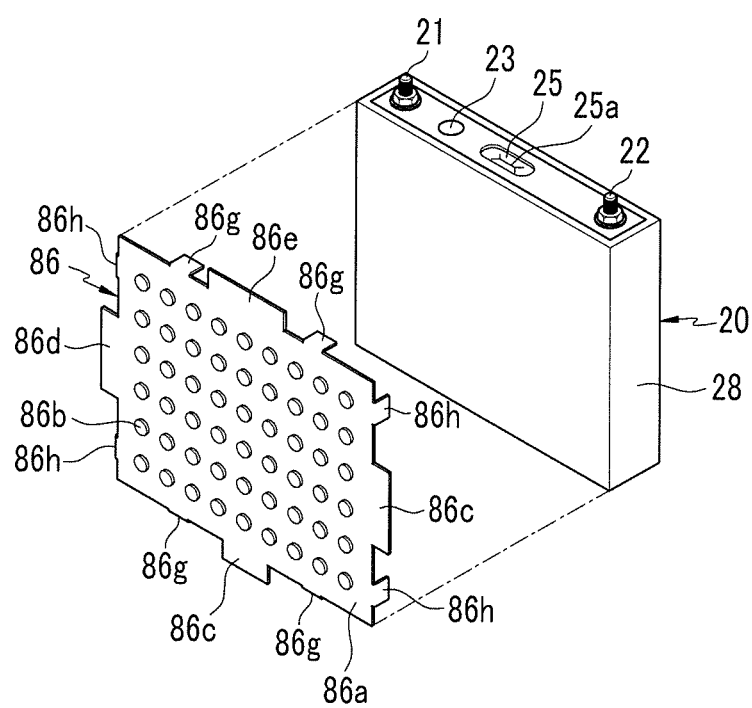
FIG. 18 is a partially exploded perspective view of a rechargeable battery and a plate of the battery module according to the eighth exemplary embodiment of the present invention.
Figure 19:
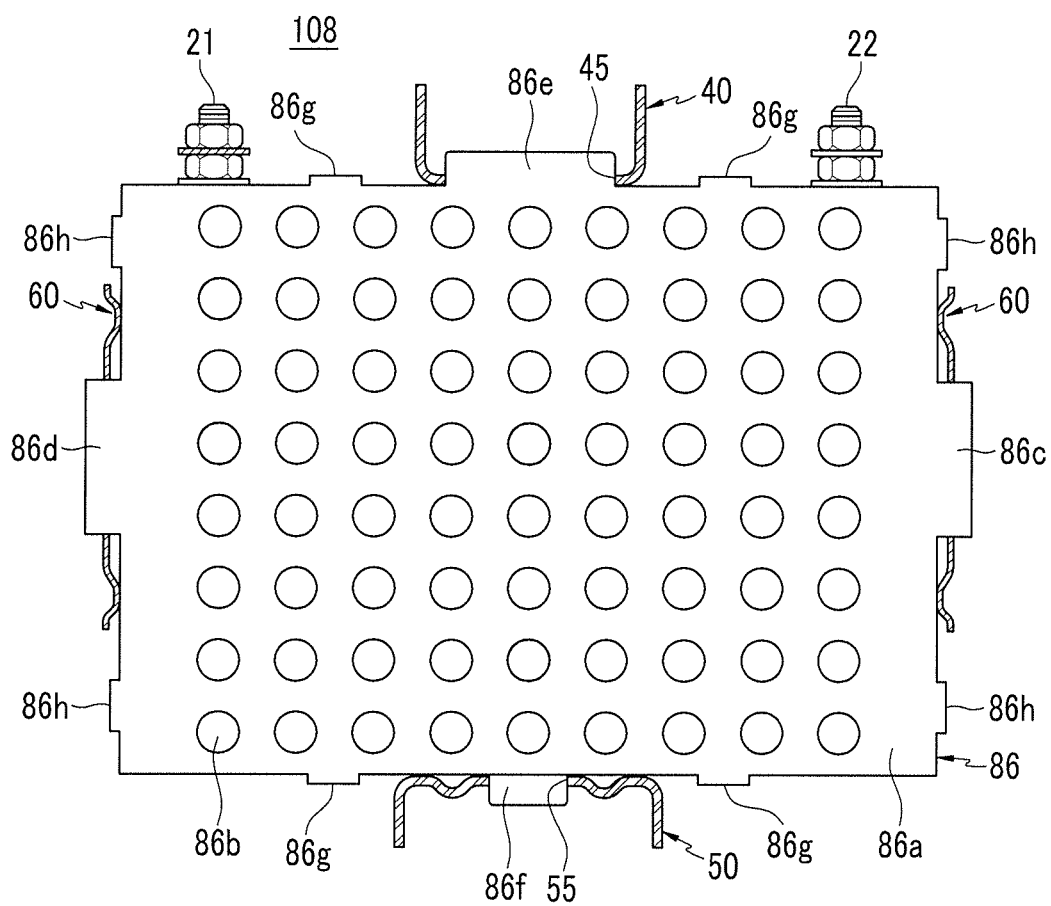
FIG. 19 is a vertical sectional view of the battery module according to the eighth exemplary embodiment of the present invention.

FIG. 18 is a partially exploded perspective view of a rechargeable battery and a plate of a battery module according to a eighth exemplary embodiment of the present invention and FIG. 19 is a vertical sectional view of the battery module according to the eighth exemplary embodiment of the present invention.

Referring to FIG. 18 and FIG. 19, a battery module 108 according to the present exemplary embodiment includes a plurality of rechargeable batteries 20, plates 86 located between the rechargeable batteries 20, end plates on the outer sides of the rechargeable batteries 20, and connection members 40, 50 and 60 connecting the end plates in a fixed manner.

The plurality of rechargeable batteries 20 are layered in parallel with each other such that wide front sides of the rechargeable batteries 20 face each other. The rechargeable battery 20 of the present exemplary embodiment is the same as the rechargeable battery of the first exemplary embodiment in structure, and therefore no further detailed description will be omitted.

Each of the plates 85 includes a rectangular-shaped cooling plate body 85a, a plurality of separating protrusions 85b forming a coolant path by separating a neighboring rechargeable battery 20, side support protrusions 85c and 85d protruding from both side ends of the cooling plate body 85a, an upper support protrusion 85e protruding from the upper end of the coolant plate 85a, a lower support protrusion 85f protruding from the lower end of the cooling plate body 85a, fixing portions 86g bent at upper and lower ends of the cooling plate body 86a, and fixing portions 86h bent at side ends of the cooling plate body 86a.

Each of the support protrusions 86c, 86d, 86e, and 86f has a substantially rectangular shape, and protrudes more to the outside than a case 28 of the rechargeable battery 20.

The fixing portions 86g and 86h are formed by being bent at the upper end, lower end, and both side ends of the cooling plate body 86a and contact upper, lower, and side surfaces of the rechargeable battery 20. The fixing portions 86g are provided at both sides of the upper and lower support protrusions 86e and 86f, and the fixing protrusions 86h are provided at both sides of the side support protrusions 86c and 86d.

The fixing portions 86g and 86h are perpendicularly bent toward the rechargeable battery 20 closely attached to the cooling plate body 86a, and are closely attached to the side surface of the rechargeable battery 20 to prevent the rechargeable battery 20 from with respect to the plate 86. Accordingly, the plate 86 moves along with the rechargeable battery 20.

The connection members 40, 50, and 60 are extended along the layered direction of the rechargeable batteries 20 such that the lateral ends thereof are respectively fixed to the end plates. The connection members 40, 50, and 60 include an upper connection member provided at the upper portion of the battery module 108, a lower connection member 50 provided at the lower portion of the battery module 108, and side connection members 60 provided at sides of the battery module 108.

The end plates, the upper connection member 40, the lower connection member 50, and the side connection members 60 are the same as the end plates, the upper connection member, the lower connection member, and the side connection members, respectively, of the battery module of the second exemplary embodiment in structure, and therefore no further description will be provided.

The upper support protrusion 86e is inserted to a coupling portion 45 formed in the upper connection member 40 and the lower support protrusion 86f is inserted to a coupling portion 55 formed in the lower connection member 50. The side support protrusions 86c and 86d are inserted to openings 61 formed in the side connection members 60.

As described, according to the present exemplary embodiment, the plates 86 are fixed to the connection members 40, 50, and 60 by the support protrusions 86c, 86d, 86e, and 86f, and the rechargeable batteries 20 are fixed to the plates 86 by the fixing portions 86g and 86h so that the rechargeable batteries 20 can be stably fixed and supported.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 101, 102, 103, 104, 105, 106, 107, 108: battery module
20: rechargeable battery
21: positive electrode terminal
22: negative electrode terminal
23: sealing cap
25: vent member
25a: notch
28: case
29: bus bar
32, 38, 82, 83, 84, 85, 86: plate
32a, 38a, 82a, 83a, 84a, 85a, 86a: cooling plate body
32b, 32c: support protrusion
32d, 32e: fixing portion
32f, 38b, 82b, 83b, 84b, 85b, 86b: separating protrusion
38c, 38d: side support protrusion
38e: upper support protrusion
38f: lower support protrusion
34, 35, 39: end plate
34a, 35a, 39a: fixing plate
34b, 34c, 35b, 35c, 35d, 39b: fastening plate
36: nut
37: bolt
38g, 82g, 83g: thermal conductivity adhesive layer
39c: hole
40: upper connection member
41, 51: support plate
42, 43, 52, 53: reinforcement plate
45, 55: coupling portion
46: exhaust hole
47, 57: fastening hole
50: lower connection member
60: side connection member
61: opening
63: reinforcement portion
81: notch

What is claimed is:
1. A battery module comprising:
a plurality of batteries stacked together, wherein each of the batteries has a vent configured to be opened to discharge gas;
a plate between adjacent ones of the batteries, the plate comprising:
a plate body;
a connecting tab extending from an edge of the plate body; and
a first connection member extending along the batteries, wherein the first connection member has a coupling portion through which the connecting tab extends and a plurality of exhaust holes generally corresponding to a respective vent of one of the batteries;
a pair of end plates each connected to the first connection member, wherein one end plate of the pair of end plates is on each end of the batteries that are stacked together; and
a second connection member extending along the batteries, wherein the second connection member is oriented substantially perpendicularly to the first connection member; and wherein the second connection member has a plurality of openings configured to allow a coolant to pass therethrough.

2. The battery module of claim 1, wherein the second connection member is coupled to the pair of end plates.

3. The battery module of claim 1, wherein the plate further comprises a support tab extending from an edge of the plate body, wherein the support tab extends in a direction substantially perpendicular to a plane of the plate body.

4. The battery module of claim 3, wherein the support tab contacts an edge of one of the batteries that is adjacent to the plate.

5. The battery module of claim 4, wherein the support tab and the second connection member contact each other.

6. The battery module of claim 5, wherein the second connection member includes a reinforcement portion that contacts each of the batteries.

7. The battery module of claim 6, wherein the reinforcement portion is arc-shaped.

8. The battery module of claim 1, wherein the plate further comprises a support tab that protrudes through an opening in the second connection member.

9. The battery module of claim 8, wherein the plate further comprises a fixing tab that extends from an edge of the plate in a direction substantially perpendicular to a plane of the plate body.

10. The battery module of claim 9, wherein the fixing tab comprises a plurality of fixing tabs that extend from a plurality of edges of the plate.

11. The battery module of claim 1, wherein the connecting tab has a notch contacting the first connection member.

12. The battery module of claim 1, wherein the plate is coupled to a respective one of the batteries by a thermally conductive adhesive.

13. The battery module of claim 1, wherein the coupling portion is an opening.

14. The battery module of claim 1, wherein the plate body has a protrusion thereon to space the plate from one of the batteries.

15. The battery module of claim 1, wherein the first connection member comprises a reinforcement portion.

* * * * *